(12) United States Patent
Locatelli et al.

(10) Patent No.: US 7,126,552 B2
(45) Date of Patent: Oct. 24, 2006

(54) DEVICE FOR TRANSMISSION OF ELECTROMAGNETIC RADIATION THROUGH A WALL

(75) Inventors: Marcel Locatelli, Montbonnot (FR); Thierry Thomas, Varces Allieres et Risset (FR)

(73) Assignee: Commissariat a l'Energie Atomique, Paris (FR)

( * ) Notice: Subject to any disclaimer, the term of this patent is extended or adjusted under 35 U.S.C. 154(b) by 639 days.

(21) Appl. No.: 10/430,720

(22) Filed: May 6, 2003

(65) Prior Publication Data

US 2003/0214774 A1 Nov. 20, 2003

(30) Foreign Application Priority Data

May 6, 2002 (FR) .................................. 02 05632

(51) Int. Cl.
*H01Q 11/02* (2006.01)

(52) U.S. Cl. ........................ 343/731; 343/841; 343/895

(58) Field of Classification Search ................ 343/731, 343/841, 895
See application file for complete search history.

(56) References Cited

U.S. PATENT DOCUMENTS 2,272,312 A * 2/1942 Tunick ........................ 343/841

FOREIGN PATENT DOCUMENTS

| EP | 1 111 537 A2 | 12/1999 |
| GB | 2 288 103 A | 10/1995 |
| WO | WO 01/73675 A2 | 10/2001 |

* cited by examiner

*Primary Examiner*—Hoang V. Nguyen
*Assistant Examiner*—Dieu Hien Duong
(74) *Attorney, Agent, or Firm*—Pearne & Gordon LLP

(57) ABSTRACT

Device for transmission of electromagnetic radiation through a wall.

In order to couple transmission-reception means (2, 4) located on each side of the wall (6), this device comprises two antennas (12, 14) placed on each side of this wall and connected to each other through this wall. Electromagnetic protection means (20) are arranged on all or some of the surfaces of the wall facing the antennas and are made of an electrically conducting material. This device is particularly applicable to a transmitter-receiver system for which one of the components is in a slightly conducting container.

7 Claims, 1 Drawing Sheet

DEVICE FOR TRANSMISSION OF ELECTROMAGNETIC RADIATION THROUGH A WALL

TECHNICAL FIELD

This invention relates to the transmission of electromagnetic signals, and particularly radio frequency signals, between two devices placed in two distinct media, these media being separated by one or more walls, and this or these walls being more or less impermeable to electromagnetic waves.

The invention is particularly applicable to the case in which one of the devices is placed in a casing with a low electrical conductivity.

STATE OF PRIOR ART

Document GB 2288103A divulges a transmission-reception system comprising two devices placed on each side of a wall. This system is provided with a passive circuit composed of two antennas placed on the two sides of the wall and connected by an appropriate electrical line that passes through the wall.

This type of system is valid if the wall does not disturb operation of the antennas, which is rarely the case. In general, the wall absorbs part of the electromagnetic field, and/or disturbs it.

In the configuration divulged, the wall may represent an electromagnetic load for the antennas, and therefore may disturb the signal to be transmitted. This occurs particularly when the electrical conductivity of the wall is mediocre, and particularly when this wall is made of a ferrous metallic alloy.

The energy efficiency of the transmission is then reduced.

Furthermore in some cases, the wall may have electromagnetic characteristics that are unstable with time. For example, it may contain mobile parts or a fluid may pass through it; its electrical conductivity can then vary, therefore causing a change in the load on the antennas which disturbs transmission of the signal.

Effects due to temperature variations (for example the appearance of currents in the wall, variations of electromagnetic properties of the wall) may also disturb this transmission.

In an extreme case, these disturbances may corrupt data transmissions in which the radio frequency signal is used as a vector, particularly by amplitude modulation and therefore degrade the signal to noise ratio of this transmission.

PRESENTATION OF THE INVENTION

The purpose of this invention is to correct the disadvantages mentioned above and therefore to improve the passive circuit mentioned above, to increase the efficiency at which electromagnetic radiation is transmitted through the wall.

The invention consists of making the wall "inactive" with regard to transmission of the electromagnetic field. To achieve this, the wall is covered with a material that forms a screen or shield and prevents interactions between the electromagnetic field and the wall.

An electromagnetic field that penetrates into a wall creates secondary induced electromagnetic sources in the wall, for example like eddy currents and/or secondary magnetization if the material is magnetic (in other words if it has a non-negligible magnetic permeability).

Firstly, these induced sources themselves transmit a secondary electromagnetic field that modifies the initial electromagnetic field close to the wall. This transmission would not necessarily be a nuisance, if it were constant in time. But in general, the walls are more likely to be optimized for their mechanical strength than from an electromagnetic point of view.

Consequently, these walls have an unstable behavior with regard to magnetic fields, which implies that the created disturbances are unstable and therefore cannot be "managed" by the user.

Furthermore, these induced sources dissipate energy due to the electrical resistance of the material and/or the magnetic drag. This dissipation is made to the detriment of the transmission that is to be set up using the passive circuit.

To avoid these disturbances, it is proposed to use a screen between the wall and the passive circuit. The function of this screen or shield is to reduce and even cancel the electromagnetic field behind the screen (on the side of the wall), if possible; in this case, induced sources will no longer be created in the wall.

This known phenomenon is due to eddy currents being set up in the screen that themselves create a secondary electromagnetic field that cancels out the initial electromagnetic field behind the screen, if the screen has a given thickness.

To benefit from good efficiency of the system, it is important to make sure that eddy currents induced in the screen necessary to create the screen effect do not dissipate too much energy.

To achieve this, it is proposed to use a material that is very slightly resistive and is therefore a good conductor, and which is sufficiently thick, for example several times the material skin depth at the frequency of the electromagnetic field.

This thickness enables good attenuation of the electromagnetic field in the wall and a reduction of "$ri^2$" type energy losses.

This material, which is preferably chosen from among the best conductors, may advantageously be non-magnetic so as to avoid the creation of secondary magnetization within the screen.

Specifically, the purpose of this invention is a device for transmission of an electromagnetic radiation, particularly a radio frequency radiation, this device comprising:

first means for transmission and/or reception of said electromagnetic radiation, second means for reception and/or transmission of said electromagnetic radiation, these second means being separated from the first means by a wall, and passive electromagnetic coupling means between the first and second means, these passive electromagnetic coupling means comprising first and second antennas which are placed on each side of the wall, and means of making an electrical connection between the first and second antennas, these electrical connecting means passing through the wall, this device being characterized in that it also comprises electromagnetic protection means arranged on all or some of the surfaces of the wall facing the first and second antennas, these electromagnetic protection means being made of an electrically conducting material.

The resistivity of the material is preferably low, less than $5 \times 10^{-8}$ ohm.meters.

According to a preferred embodiment of the device according to the invention, the thickness of the material is greater than the wall skin depth, with respect to the electromagnetic radiation.

The thickness of this material may be more than twice and less than ten times this skin depth.

Preferably, the electromagnetic protection means form a layer over all or some of the surfaces of the wall facing the first and second antennas.

Furthermore, the material is preferably a non-magnetic material such as a pure metal, for example aluminum, copper, silver or gold.

BRIEF DESCRIPTION OF THE DRAWINGS

This invention will be better understood after reading the description of example embodiments given below, for information purposes only and in no way limitative with reference to the attached drawings on which.

DETAILED PRESENTATION OF PARTICULAR EMBODIMENTS

Figure 1:
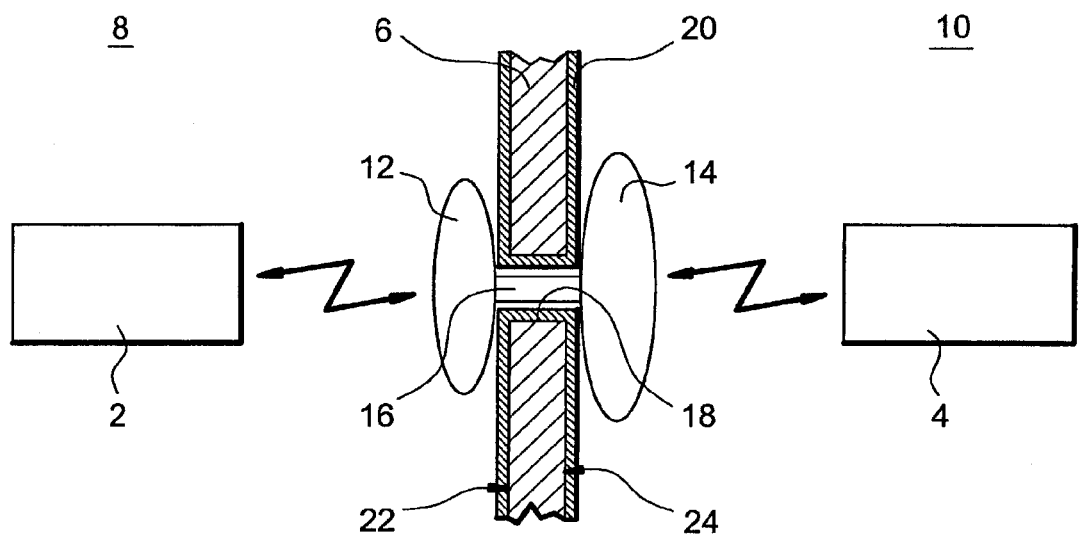
FIG. 1 is a diagrammatic sectional view of a particular embodiment of the device according to the invention.

The device according to the invention, which is diagrammatically shown in FIG. 1, comprises a radio frequency radiation transmitter 2 and a radio frequency radiation receiver 4.

A wall 6 separates the area 8 in which the transmitter 2 is located, from the area 10 in which the receiver 4 is located.

This device also comprises two antennas 12 and 14, electromagnetically and passively coupling the transmitter 2 and the receiver 4, and an electrical connecting line 16 between the antennas 12 and 14.

This connection may also comprise impedance matching devices between the antennas and the line, possibly putting the antennas into resonance.

These antennas 12 and 14 are placed on each side of the wall 6, the antenna 12 being on the same side as the transmitter 2, while the antenna 14 is on the same side as the receiver 4.

The wall 6 comprises a drilling 18 that forms communication between the area 8 and the area 10. The electrical connecting line 16 passes through this drilling 18.

According to the invention, the device shown in FIG. 1 also comprises a coating 20 that forms an electromagnetic protection and that is arranged on all or some of the surfaces of the wall 6 facing the antennas 12 and 14.

In the example in FIG. 1, this coating 20 covers the face 22 of the wall facing the antenna 12, and the face 24 of the wall facing the antenna 14. The coating also covers the drilling walls 18 in this example, but this is not essential.

This coating forms a layer made from an electrically conducting and non-magnetic material with a very low resistivity of less than $5 \times 10^{-8}$ ohm.meters, and therefore which has a high electrical conductivity.

Thus, by covering the wall 6 through which the electrical connecting line 16 passes, with a material with a high electrical conductivity, so that the imaginary part (reactance) of the impedance that represents the load created on each of the antennas 12 and 14 by the wall 6 is considerably greater than the real part (resistance) of this impedance, the disturbing effects due to the wall 6 can be limited or even eliminated.

Moreover, it is preferable if the thickness of the conducting coating and its surface is such that the dissipative load (resistance) added at each antenna 12 and 14 by the wall-coating assembly, is negligible compared with the specific loads of this antenna.

This dissipative load is related to the existence of eddy currents induced in an electrically conducting wall in the presence of an electromagnetic radiation over a thickness called a "skin depth". This skin depth δ is a decreasing function of the frequency f of the electromagnetic radiation. We have:

$$\delta = 1/(\mu.\sigma.2\pi.f)$$

where σ represents the conductivity of the coating and μ the magnetic permeability of this coating.

The thickness of the layer forming the coating 20 is chosen to be between 2δ and 10δ, for example 5δ.

Furthermore, a material with good electromagnetic insensitivity to temperature variations is chosen. For example, a pure non-magnetic metal may be chosen such as aluminum, copper, silver or gold.

In the example shown in FIG. 1, it is obviously possible to invert the transmitter 2 and the receiver 4. Furthermore, the invention can be used with two transmitters-receivers placed on each side of the wall 6.

Furthermore, the invention may also be used with electromagnetic radiation other than radio frequency radiation, for example over a higher range of frequencies (of more than several GHz).

The invention is applicable to any wireless transmission systems, particularly to enable relative movements between the transmitter and the receiver, for a connection hindered by the presence of walls (for example if there is a mechanical protection).

For example, the invention is applicable to the case of a metallic protection container made of an alloy with high mechanical strength that is usually accompanied by a low electrical conductivity, this container being removable and containing an object identified by a radio frequency label.

Figure 2:
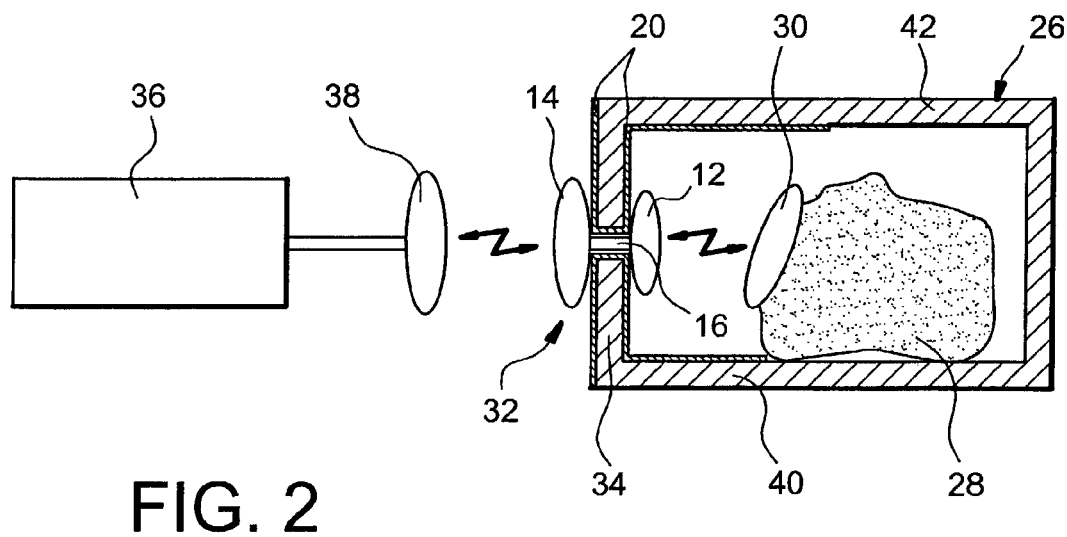
FIG. 2 is a diagrammatic sectional view of a system to which the invention is applied.

This is diagrammatically illustrated in FIG. 2, in which the removable container 26 containing the object 28 provided with a radio frequency antenna-label 30 can be seen.

A passive coupling circuit 32 of the type illustrated in FIG. 1 can also be seen, thus comprising the two antennas 12 and 14 connected by the line 16.

The antenna 12 is placed in the container 26 facing the antenna-label 30, and communicates with it. The antenna 14 is placed on the outside of the container 26. The line 16 passes through a wall 34 of this container 26.

The instrumentation means 36 that are provided with an antenna 38 to communicate with the antenna-label 30 through the circuit 32, can also be seen.

According to the invention, a coating 20 of the type referred to in the description in FIG. 1, covers the outside face of the wall 34 of the container 26, facing the antenna 14 and the inside face of this wall 34 that is facing the antenna 12.

In the example shown in FIG. 2, the coating 20 also covers part of the inside faces of two other walls 40 and 42 of the container 26, that are close to the wall 34.

The part of these internal faces thus covered surrounds the internal area of the container 26 where the antennas 12 and 14 are located.

The invention claimed is:

1. Device for transmission of an electromagnetic radiation, particularly a radio frequency radiation, this device comprising:
   first means (2) for transmission and/or reception of said electromagnetic radiation,
   second means (4) for reception and/or transmission of said electromagnetic radiation, these second means being separated from the first means by a wall (6), and
   passive electromagnetic coupling means (32) between the first and second means, these passive electromagnetic coupling means comprising first and second antennas (12, 14) which are placed on each side of the wall, and means of making an electrical connection (16) between the first and second antennas, these electrical connecting means passing through the wall,
this device being characterized in that it also comprises electromagnetic protection means (20) arranged on all or some of the surfaces of the wall facing the first and second antennas, these electromagnetic protection means being made of an electrically conducting material.

2. Device according to claim 1, in which the resistivity of the material is low, less than $5 \times 10^{-8}$ ohm.meters.

3. Device according to claim 1 or 2, in which the thickness of the material is greater than the wall skin depth, with respect to the electromagnetic radiation.

4. Device according to claim 3, in which the thickness of the material is more than twice and less than ten times said skin depth.

5. Device according to any one of claims 1 or 2, in which the electromagnetic protection means form a layer (20) over all or some of the surfaces of the wall facing the first and second antennas.

6. Device according to any one of claims 1 or 2, in which the material is a non-magnetic material.

7. Device according to claim 6, in which the material is chosen from among aluminum, copper, silver or gold.

* * * * *